US007397759B2

(12) United States Patent
Tan et al.

(10) Patent No.: US 7,397,759 B2
(45) Date of Patent: Jul. 8, 2008

(54) RESPONSE FOR SPURIOUS TIMEOUT

(75) Inventors: Kun Tan, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 10/800,897

(22) Filed: Mar. 15, 2004

(65) Prior Publication Data

US 2005/0201279 A1    Sep. 15, 2005

(51) Int. Cl.
*G06F 11/00*    (2006.01)
(52) U.S. Cl. .................. 370/216; 370/230; 370/235; 714/748
(58) Field of Classification Search .......... 370/216, 370/230, 230.1, 231, 235, 242; 714/749, 714/748
See application file for complete search history.

(56) References Cited

U.S. PATENT DOCUMENTS

| 7,046,672 B2* | 5/2006 | Liao et al. ............... 370/395.1 |
| 2002/0150048 A1* | 10/2002 | Ha et al. ..................... 370/231 |
| 2005/0135248 A1* | 6/2005 | Ahuja et al. ................ 370/235 |
| 2005/0165948 A1* | 7/2005 | Hatime ....................... 709/235 |

OTHER PUBLICATIONS

Blanton et al, "Practices for TCP Senders in the Face of Segment Reordering", IETF Standard-Working-Draft, Intenet Engineering Task Force, IETF, CH, Feb. 2003.

Gurtov et al, "Responding to Sperious Timeouts in TCP", IEEE Infocom 2003. Twenty-second Annual Joint Conference of the IEEE Computer and Communications Societies, Mar. 30, 2003-Apr. 3, 2003, pp. 2312-2322.
Sarolahti et al, "F-RTO: An Enhanced Recovery Algorithm for TCP Retransmission Timeouts", Computer communication Review, Association for Computing Machinery, New York, NY, vol. 33, No. 2, Apr. 2003, pp. 51-63.
Swami et al, "DCLOR: De-correlated Loss Recovery using SACK Option for Spurious Timeouts", IETP Internet Draft, Online! Mar. 8, 2004, pp. 1-9. URL: http://www.watersprings.org/pub/id/draft-swami-tsvwg-tcp-dclor-03.txt.
Huang, "An ACK Buffering Method to Improve TCP Performance in Mobile Computing Environments", IEICE Transactions on Communications, vol. E85B, No. 10, pp. 2273-2281, Oct. 2002.
Pan, "TCP Performance and Behaviors with Local Retransmissions" Journal of Supercomputing, vol. 23, No. 3, pp. 225-244 Nov. 2002.

* cited by examiner

*Primary Examiner*—Melvin Marcelo
*Assistant Examiner*—Nguyen Ngo
(74) *Attorney, Agent, or Firm*—Lee & Hayes, PLLC

(57) ABSTRACT

A spurious timeout (STO) response allows a sending device to conservatively adjust congestion state parameters and maintain the packet flow, after detection of the STO. Since occurrence of an STO may be accompanied by data loss, the STO response couples the spurious timeout and the loss event by maintaining a value of previously available bandwidth and increasing a limit that a sending host can send based on a pattern of returned acknowledgements. In particular, the limit is increased by the maximum size of a data segment that the sending host can send each time an acknowledgement is received from the receiving host indicating a successful transmission of a data packet. Thus, a positive data flow may be maintained conservatively while avoiding further packet losses and an unnecessary re-transmission of data packets that may have been successfully received by the receiving host.

24 Claims, 7 Drawing Sheets

RESPONSE FOR SPURIOUS TIMEOUT

FIELD

The present invention is directed towards techniques for responding to a spurious timeout in a wireless wide-area network.

BACKGROUND

In wireless environments such as GPRS (General Packet Radio Service), retransmission timers are known to often expire spuriously, triggering an unnecessary retransmission of one or more data packets even when there has been no actual loss of transmitted data. Such "spurious timeouts," as they are known (also referred to as an "STO"), are generally attributable to limitations in a Transmission Control Protocol (hereafter "TCP") stack.

Spurious timeouts in wireless networks have various causes including, e.g. the emergence of data packets having higher transmission priority competing for transmission bandwidth, resulting in a spurious retransmission timeout; a persistent reliable wireless link layer repeatedly retransmitting a data packet over a poor radio connection several times to cause a TCP sending host time-out; or a receiving host being unable to send an acknowledgement message (hereafter "ACK") to a sending host in a timely manner due to a busy reverse channel.

In the TCP stack, the MSS ("maximum segment size") indicates the maximum amount of data (in bytes) that a sending host is able to send to a receiving host in a single packet, or segment. Generally, for the sake of efficiency, a sending host sends data packets in accordance with MSS. A TCP window (hereafter "window") refers to the amount of data that a sending host may send before receiving an acknowledgment (also referred to as an "ACK") regarding the data sent from the receiving host.

ACK is a communication code sent from the receiving host to the sending host to acknowledge receipt of transmitted data. Further, ACK may be transmitted to the sending host from the receiving host after every TCP segment of data is received. Alternatively, ACK may be selectively transmitted to the sending host from the receiving host if out-of-order data packets are received. The received data packets are reported in extended TCP header options referred to as Selective Acknowledge (hereafter "SACK") blocks. Regardless, TCP is unable to distinguish whether ACK or SACK is generated in response to an originally transmitted segment of data or a retransmitted segment of data.

Typically, upon an occurrence of a timeout, a TCP stack defaults to a retransmission of an entire window's worth of data which has not been acknowledged. But, as stated above, not all timeouts are caused by data loss. Therefore, the automatic retransmission may lead to bandwidth being unnecessarily devoted to retransmission of data that has already been successfully received. Consequently, the integrity of a network connection is diminished.

Such automatic retransmission of TCP segments of data may violate the "packet conservation principle," which states that data should not be introduced to a network until previously transmitted data has been acknowledged as having been received or has been confirmed as having been lost. Clearly, any automatic retransmission of TCP segments after a spurious timeout is incompatible with the packet conservation principle.

SUMMARY

Techniques for responding to spurious timeouts experienced in wireless networks are described. When a spurious timeout occurs, one described response is to continue data flow from a sending host under congestion state parameters until or unless data loss is confirmed. In particular, congestion state values are restored and data transmissions continue at a flow-rate that may gradually increase, depending upon received acknowledgements. Restoring congestion state values includes restoring a useable bandwidth detected prior to the timeout and restoring a default value of a limit of the amount of data that can be transmitted before receiving an acknowledgement. The latter value is known as a congestion window. As transmission data flow continues, any increase to the congestion window is dependent upon the receipt of an acknowledgment from a receiving host. This is because an acknowledgement indicates that data packets are flowing from a sending host to a receiving host and are not lost on the network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following description is directed to techniques for responding to spurious timeouts experienced in wireless networks. Since timeouts are not always indicative of data loss, an automatic re-transmission of data upon a spurious timeout is a potentially wasteful response, in terms of network resources. The conservative response embodied in the following examples avoids redundant data transmissions by maintaining a positive data flow from a sending host until, or unless, data loss is confirmed. The response includes restoring congestion state values and increasing the size of the congestion window based on received acknowledgements. A congestion window (also referred to as "cwnd") is a state variable limiting the amount of data that the sending host is able to transmit over the network before receiving an acknowledgement.

The example embodiments described herein may utilize any of a variety of network protocols, including public and/or proprietary protocols. The embodiments are by way of example, and are not intended to be limiting in any manner.

Figure 1:
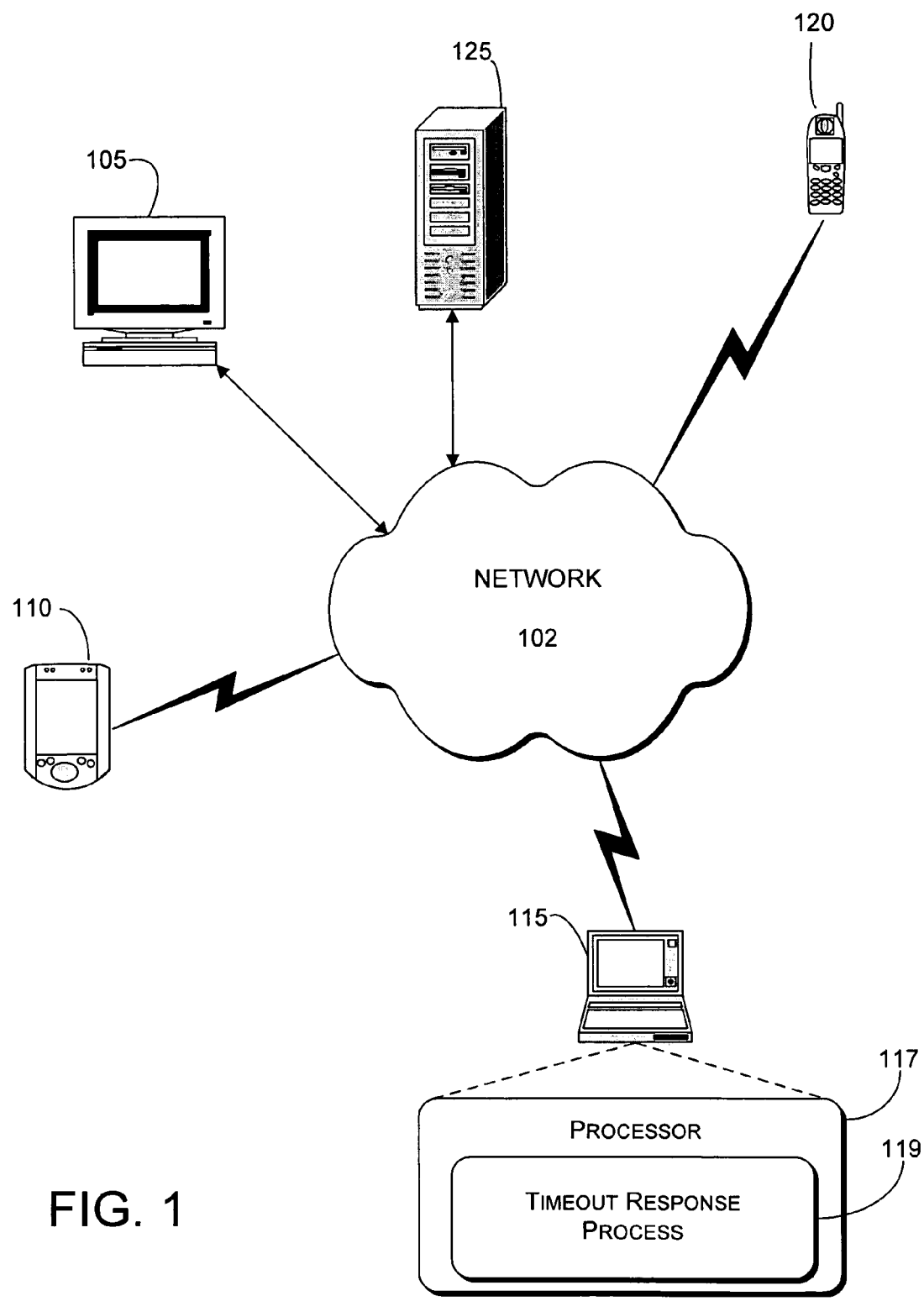
FIG. 1 shows devices communicating over a wireless network, with the devices implementing technologies for responding to spurious timeouts.

FIG. 1 shows an exemplary architecture 100 in which network 102 enables communication among client devices 105, 110, 115, and 120, and server device 125. Network 102 is intended to represent any of a variety of conventional network topologies and types, which may include wired and/or wireless networks. Network 102 may further utilize any of a variety of conventional network protocols, including public and/or proprietary protocols. Network 102 may include, for example, the Internet as well at least portions of one or more local area networks (LANs).

Client device 105 may include any of a variety of conventional computing devices, including a desktop personal computer (PC), workstations, mainframe computers, Internet appliances, and gaming consoles. Further client devices associated with network 102 may include personal digital assistant (PDA) 110, laptop computer 115, and cellular telephone 120, etc., which may be in communication with network 102 by a wired and/or wireless link. Further still, one or more of client devices 105, 110, 115, and 120 may include the same types of devices, or alternatively different types of devices.

Server device 125 may provide any of a variety of data and/or functionality to computing devices 105, 110, 115, and 120. The data may be publicly available or alternatively restricted, e.g., restricted to only certain users or available only if the appropriate fee is paid. Server device 125 is at least one of a network server, an application server, a web blade, or may be any combination thereof. Server device 125 is any device that is the source of content, and client devices 105, 110, 115, and 120 include any devices that receive such content. An example embodiment of a client or server device is described in further detail below with reference to FIG. 7.

Any one of client devices 105, 110, 115, 120, and server device 125 may act as a sending host or receiving host in accordance with the example embodiments described herein. For descriptive purposes, which are not intended to be limiting in any manner, client device 115 is a sending host that transmits data to a receiving host via network 102. Sending host 115 includes processor 117, which implements a spurious timeout response 119 corresponding to the example embodiments described herein.

Protocols corresponding to network 102 of FIG. 1 may include, but are not limited to, TCP/IP (Transmission Control Protocol/Internet Protocol), whereby TCP is a connection-based, stream-oriented delivery service to implement end-to-end error detection and correction. When transmitting data from sending host 115 to the receiving host, spurious timeouts are not unusual occurrences in network 102, which may be a wireless wide-area network. Those skilled in the art understand any effects of such timeouts on transmission transactions. However, the occurrence of a spurious timeout is not necessarily indicative of a lost data packet or congestion.

The spurious timeout response 119 handles spurious timeouts in a manner that does not automatically result in retransmission of data. Rather, if a spurious timeout (STO) is detected, the spurious timeout response 119 responds to an STO by restoring congestion state values and maintaining a positive data flow from the sending host. That is, the data flow from the sending host does not include any re-transmissions of data packets until or unless data loss is confirmed.

More particularly, the spurious timeout response 119 directs the TCP stack to restore a slow-start threshold (also referred to as "ssthresh") to its value prior to when the timeout is detected and gradually increases a congestion window "cwnd." The slow-start threshold "ssthresh" is a state variable relating to estimated available bandwidth that is utilized for controlling data transmission, and, again, the congestion window "cwnd" is a state variable limiting the amount of data that the sending host is able to transmit over the network before receiving an acknowledgement "ACK". After a timeout occurs, the congestion window is set to MSS, and the first unacknowledged packet is retransmitted. However, if it turns out that retransmission in unnecessary, i.e. the original transmission is successfully received by the receiving host, the sending host stops retransmitting other timeout packets. Additionally, the congestion window is increased by the maximum segment size (MSS) (i.e., cwnd=cwnd+MSS) upon receiving ACK since ACK is indicative of a successful transmission of a timeout data packet. That is, since ACK provides the accurate data necessary for revalidating a network path, receiving an ACK indicates that the amount of data that can be transmitted may increase.

Figure 2:
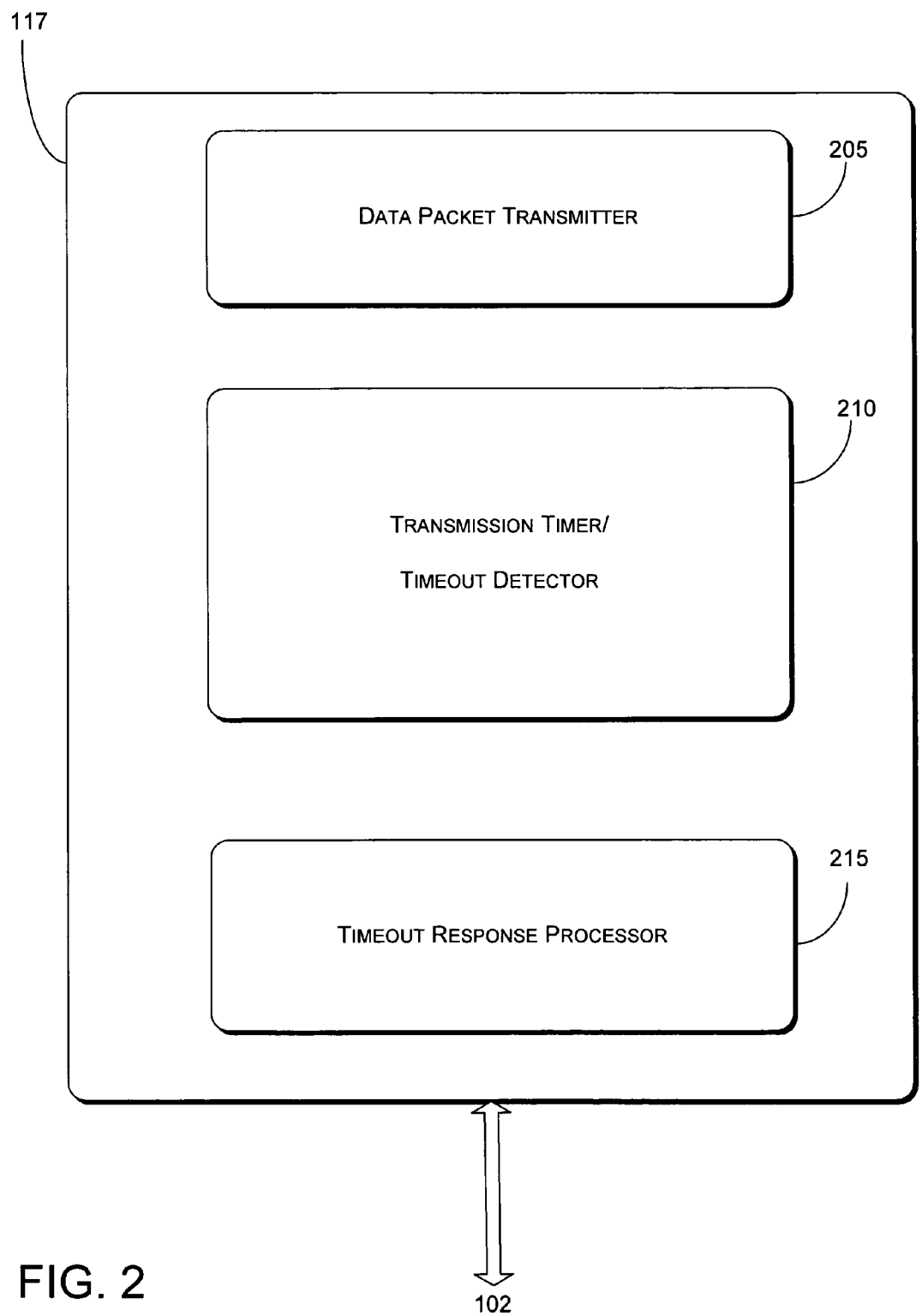
FIG. 2 shows a communication environment for implementing example embodiments described herein.
Figure 4:
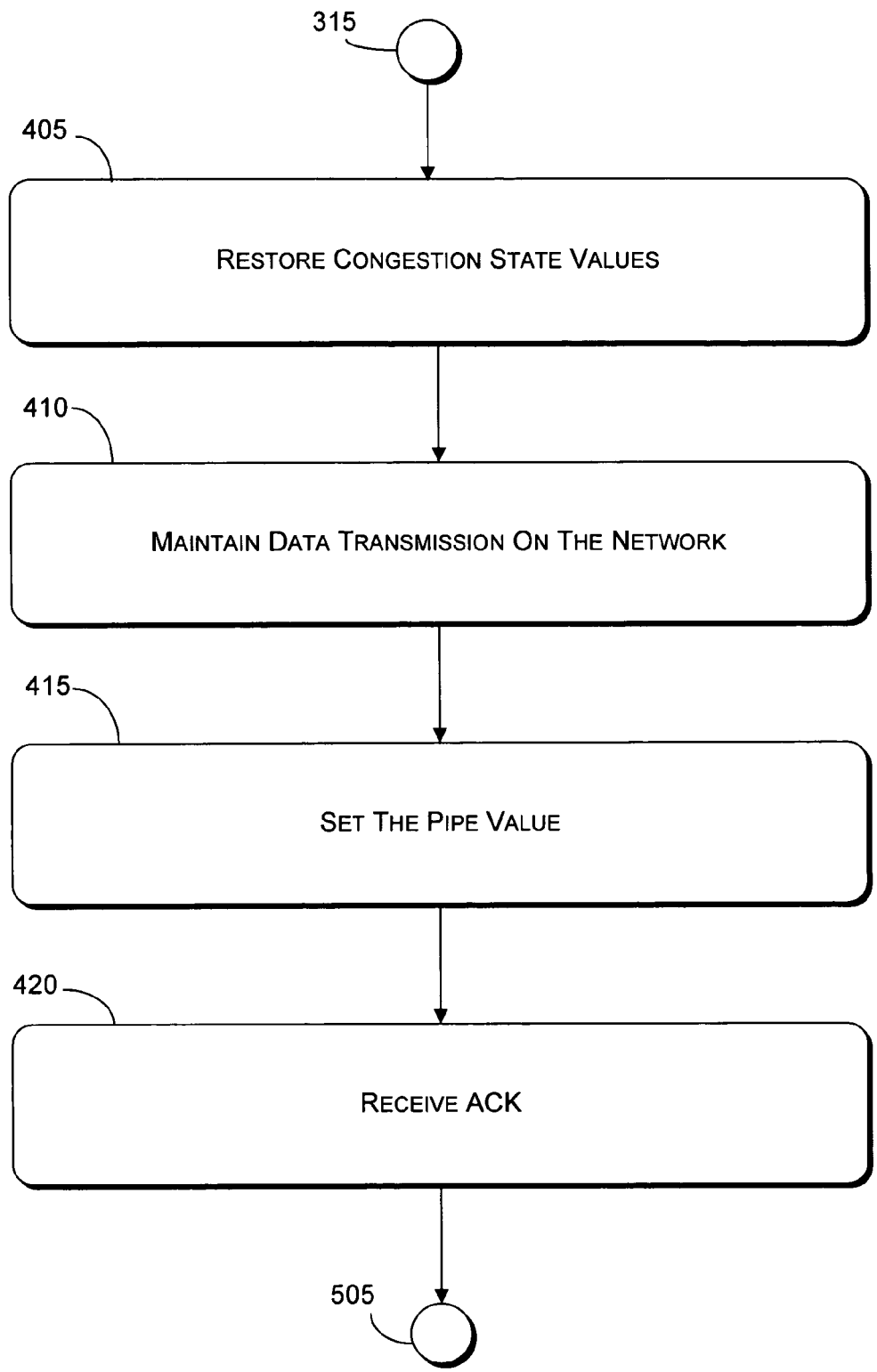
FIGS. 4-6 illustrate an example of an aspect of the process for responding to a spurious timeout shown in FIG. 3.
Figure 5:
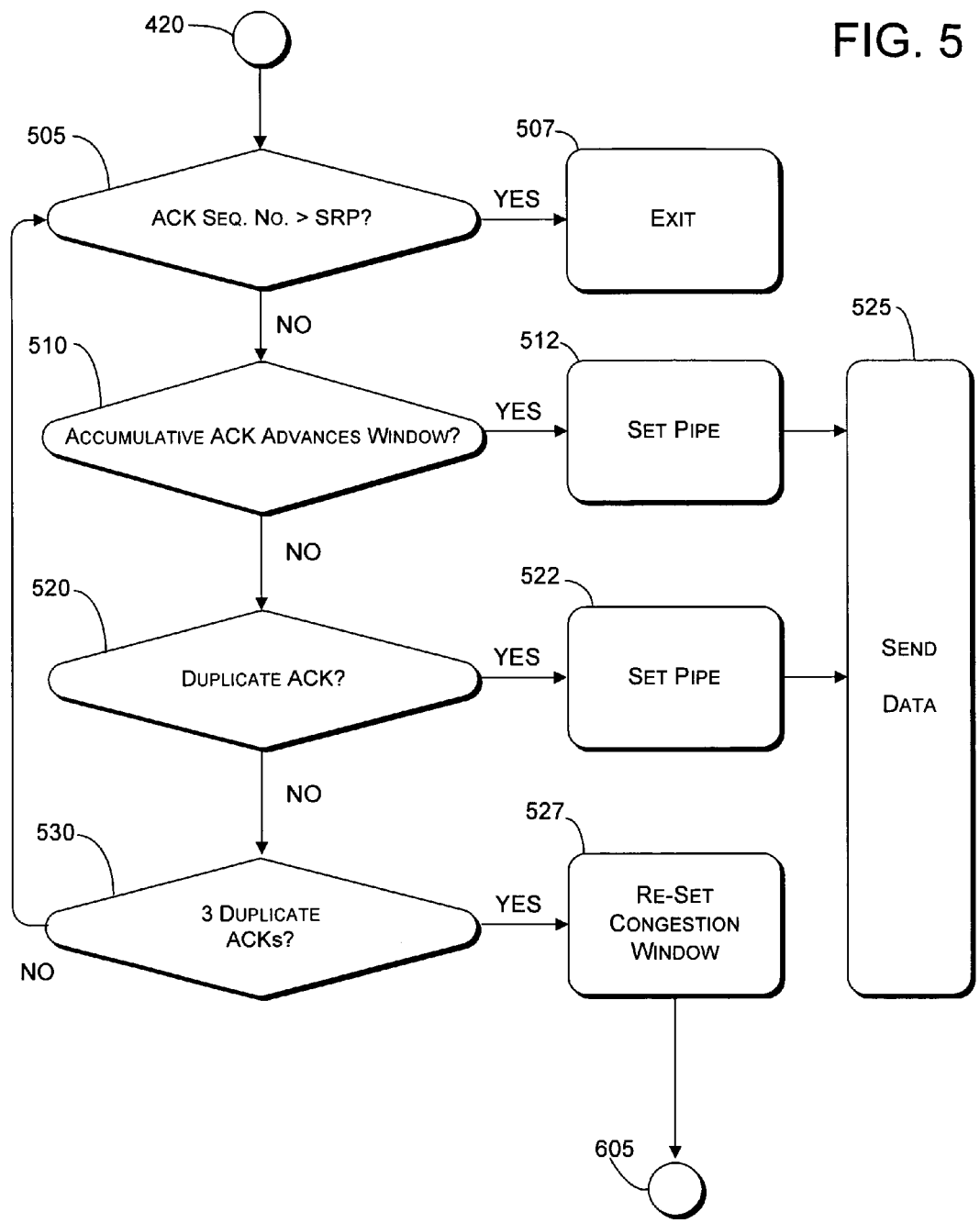
Figure 6:
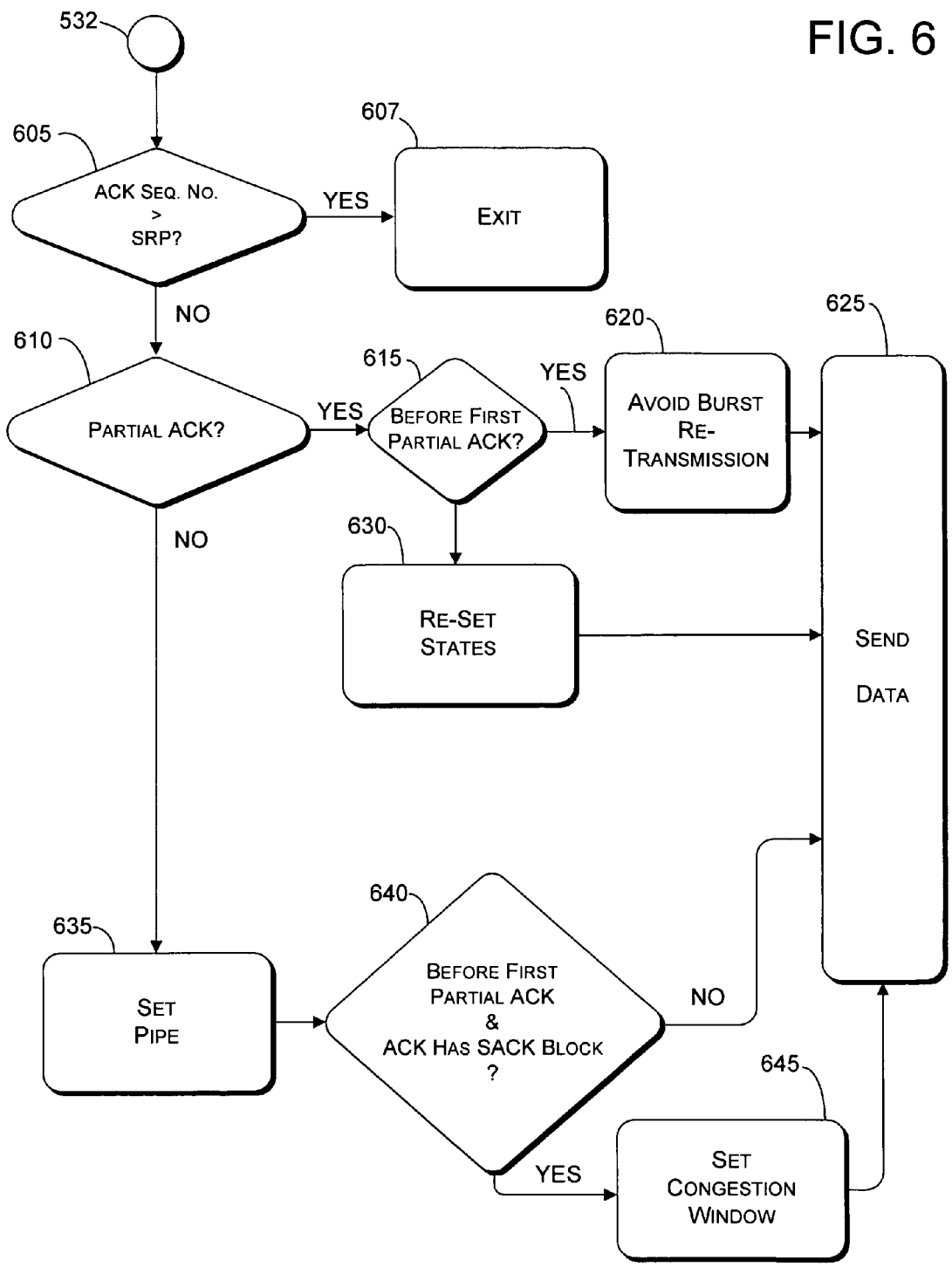

FIG. 2 shows the processor 117 of the sending host 115 in more detail. Processor 117 includes data packet transmitter 205, which transmits data packets to a receiving host utilizing e.g., the TCP protocol. Transmission timer/timeout detector 210 tracks the time after a data packet has been transmitted from transmitter 205. Thus, transmission timer/timeout detector 210 detects a timeout when a predetermined amount of time, e.g., 500 msec, has passed after the data packet has been transmitted and no ACK corresponding to the data packet has been received back at sending host 115. If the timeout is determined to be a spurious timeout, timeout response processor 215 implements the timeout response process 119 (see FIG. 1), which is a "spurious timeout detection with repacketization" (hereafter referred to as "STODER") response. FIGS. 4-6 describe timeout response process 119 in greater detail. The processing modules shown in FIG. 2 may be implemented as shown, separately, or in various combinations thereof.

Figure 3:
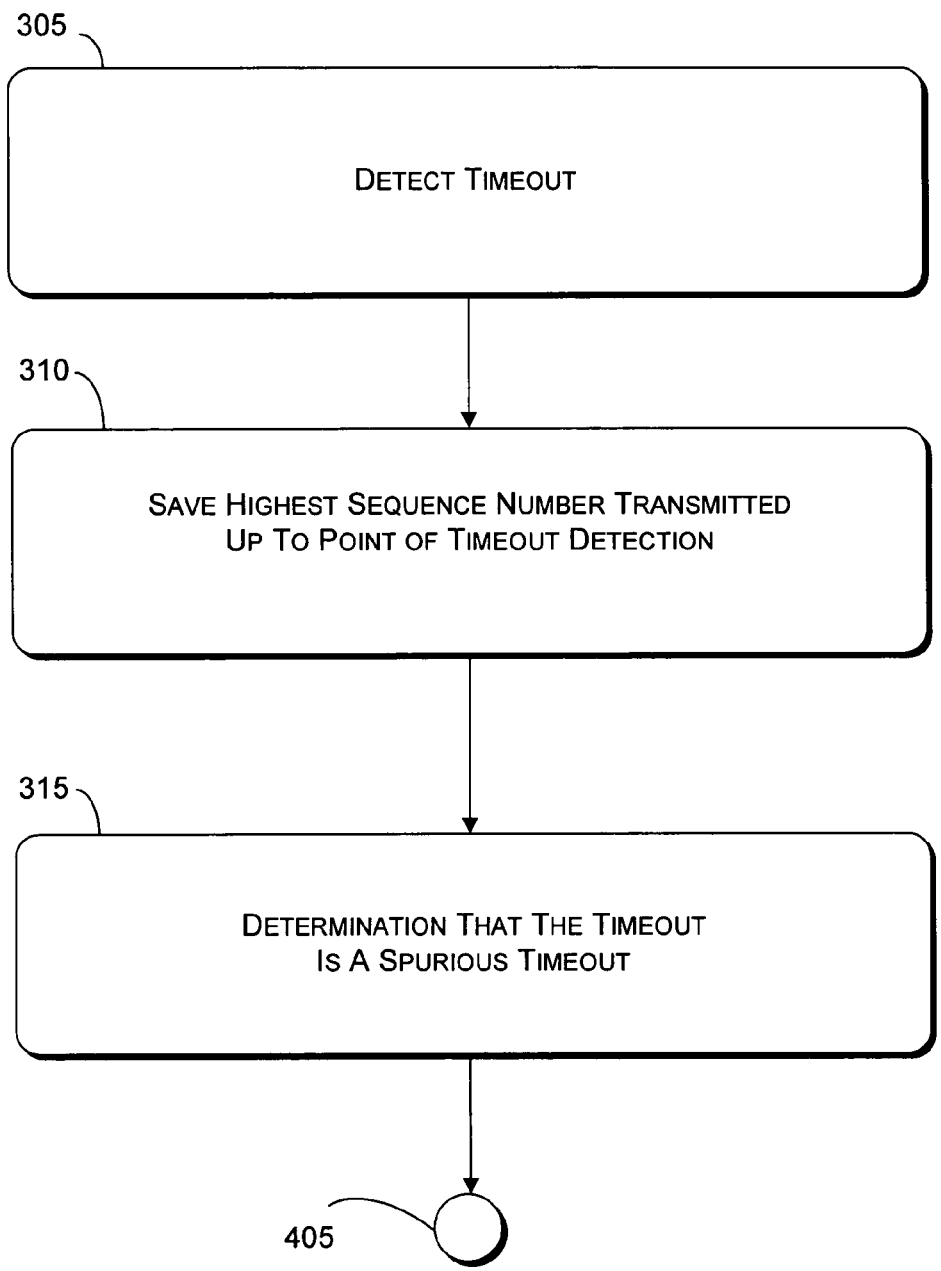
FIG. 3 is a flow diagram of a process for responding to a spurious timeout.

FIG. 3 shows a timeout response process 119 for responding to a spurious timeout. Process 119 is illustrated as a set of blocks, each representing at least one operation performed to carry out the process. The operations may be implemented by software, hardware, firmware, or any combination thereof. Again, for discussion purposes, the process 119 is described in the context of transmission of data packets from the sending host 115 to a receiving host upon occurrence of a timeout.

At 305, the sending host 115 detects a timeout condition. Upon detection of a timeout, the sending host 115 saves 310 the highest sequence number corresponding to data packets transmitted from the sending host 115 up to the point of timeout detection. The saved sequence number may serve as a reference point for subsequent data packet transmissions. Then, the first unacknowledged packet is retransmitted. Upon receiving the first acknowledgement from the receiving host, the determination 315 that the timeout is a spurious timeout (STO) is made in accordance with techniques known in the art. Examples of such techniques include, but are not limited to, those described in co-pending application U.S. Ser. No. 10/758,510, which was filed in the U.S. Patent and Trademark Office on Jan. 15, 2004, and therefore are not described herein.

FIGS. 4-6 show the example protocol response 119 that is implemented upon detection 315 of an STO. In particular, the STODER response described herein does not respond to an STO by automatically retransmitting data packets or by defaulting to congestion control state processing, but rather implement a response in compliance with the packet conservation principle.

FIG. 4 shows initial operations in the STODER response. Because the detection 315 (see FIG. 3) of an STO is not necessarily predicated upon the loss of a data packet, congestion state values are restored 405 to maintain positive data flow from sending host 115. Parameters for a next data packet to be transmitted are set to be substantially equal to previously sent data packets that were sent up to the point of STO detection. This point may be termed the "STODER Recovery Point" (hereafter "SRP"). The slow-start threshold "ssthresh" is restored to be substantially equal to its value before the timeout occurs and the congestion window "cwnd" is set to be twice the maximum segment size (i.e., cwnd=2*MSS). This complies with a known TCP principle for an initial value of the congestion window that does not exceed the size of two data packets.

In the absence of confirmation that a data packet has been lost, compliance with the packet conservation principle requires that no previously transmitted data be retransmitted.

That is, at this point, the continuing data flow is to include only newly transmitted data packets. Therefore, at 410, the sending host 115 maintains data flow by transmitting up to two new data packets to a receiving host. It should be noted that the number of new data packets transmitted over the network to maintain the data flow may vary as protocols evolve.

At 415, the sending host 115 sets a "pipe" value, which is a sending-side estimate of a number of bytes outstanding in the network. At this stage, the pipe value is set to equal the difference between the maximum sequence number sent so far (i.e., snd.max) and the lowest sequence number that is not yet acknowledged (i.e., snd.una), plus the maximum segment size (MSS):

$$pipe=MSS+snd.max-snd.una$$

The addition of MSS is provided to account for a re-transmission of the first data packet that is timed out.

At 420, the sending host 115 receives an acknowledgement (ACK). Subsequent processing is influenced by whether the ACK advances a positive data flow or whether it is a duplicate ACK. The ACK advances a positive data flow if it indicates that a transmitted data packet has been successfully received at the receiving host. A duplicate ACK is an ACK that does not accumulatively acknowledge any new data but just repeat Snd.una in its acknowledgement field.

FIG. 5 continues the example embodiment of the STODER response after ACK is received 420 (see FIG. 4) at sending host 115. A determination 505 is made as to whether the received ACK acknowledges a sequence number covering the SRP. If the sequence number corresponding to the ACK covers the SRP (ACK Seq. No.>SRP) (i.e., the "Yes" branch from 505), then the STODER response terminates 507.

Otherwise, a determination 510 is made as to whether ACK acknowledges data less than SRP, i.e., whether ACK acknowledges some new data but does not cover SRP. Such an ACK indicates some data packets have left the network. Therefore, after a positive determination of this condition (i.e., the "Yes" branch from 510), the pipe value is adjusted to reflect the reduction of packets outstanding (i.e., block 512). Further, since the ACK indicates that some data has been successfully received at the receiving host, if the congestion window "cwnd" is less than the slow-start threshold "ssthresh" (i.e., cwnd<ssthresh) when the ACK is received, then the congestion window "cwnd" may be opened by adding a maximum segment size "MSS" to the congestion window "cwnd" (i.e., cwnd=cwnd+MSS). Subsequently, to maintain a consistent data flow, new data packets, i.e., data that has not yet been transmitted, can be transmitted if the pipe value is less than the congestion window "cwnd" (i.e., pipe<cwnd).

Otherwise, a determination 520 is made as to whether the ACK is a "duplicate ACK," that is, whether the ACK has the same sequence number or less than the lowest number of unacknowledged data, i.e., snd.una. After a determination of a duplicate ACK (i.e., the "Yes" branch from 520), an estimate of the amount of outstanding data in the network is adjusted by re-setting 522 the pipe value to be the original pipe value less the maximum segment size "MSS" (i.e., pipe=pipe−MSS).

Further, if the duplicate ACK includes a SACK block that selectively acknowledges a data segment less than that of SRP and the congestion window "cwnd" is less than the slow-start threshold "ssthresh" (i.e., cwnd<ssthresh), the congestion window "cwnd" is re-set by adding the maximum segment size "MSS" to a current value of the congestion window "cwnd" (i.e., cwnd=cwnd+MSS). Subsequently, to maintain a consistent data flow, new data packets are transmitted if the pipe value is less than the congestion window "cwnd" (i.e., pipe<cwnd).

Otherwise, when a determination 530 is made that three duplicate ACKs have been received, it is presumptively assumed that a data packet has been lost from the network (i.e., the "Yes" branch from 530). Therefore, a lost data packet for which no ACK has been received may be re-transmitted 525 from sending host 115 upon reception of the third duplicate ACK. Further, since a loss is detected, the slow-start threshold "ssthresh" state value and the congestion window "cwnd" state values are re-set 527. Specifically, the slow-start threshold is reduced by one-half of its original value (i.e., ssthresh=ssthresh/2), and the congestion window is set to be the lesser of the congestion window and the slow-start threshold (i.e., cwnd=min(cwnd, ssthresh)) at the point that the third duplicate ACK is received. In the case of a negative determination 530 regarding three duplicate ACKs, processing returns to 505.

In addition to a re-transmission of lost data, the response to the STO thus transitions to SACK-based slow-start recovery processing.

FIG. 6 shows SACK-based slow-start recovery processing. The receipt of ACK at sending host 115 after the slow-start threshold state value and the congestion window state value have been re-set 527 (see FIG. 5) causes a determination 605 to be made as to whether the received ACK acknowledges a sequence number covering the SRP, i.e., whether ACK corresponds to any outstanding data not yet acknowledged. Thus, if the sequence number corresponding to the ACK covers the SRP (i.e., the "Yes" branch from 605), then STODER response terminates 607.

Otherwise, a determination 610 is made as to whether ACK acknowledges data less than indicated at the SRP, i.e., whether the ACK is a "partial ACK." A determination 615 of a first partial ACK in the SACK-based slow-start recovery phase (i.e., the "Yes" branch from 610) leads to the presumptive conclusion that all data packets below the SRP are lost. Therefore a re-transmission burst is to be avoided 620 by re-setting the pipe value to be the size of the data to be re-transmitted (retran_data) plus the data sent up to the point of determination of the partial ACK less the SRP (snd.max−SRP), and the selectively acknowledged data packets above the SRP (sacked_pkts above SRP):

$$pipe=retran\_data+(snd.max-SRP)-(sacked\_pkts\ above\ SRP);$$

Additionally, the congestion window "cwnd" is adjusted to be the minimum value between window and the pipe value plus the initial window value of 2*MSS:

$$cwnd=min(cwnd, pipe+(2*MSS)).$$

Data is then sent 625 in the form of the data packets below the SRP, which are deemed to be lost.

A subsequent reception of a partial ACK results in state values being re-set 630, including the pipe value being re-set to the original pipe value less the size of the data acknowledged (i.e., pipe=pipe−data_acked) and the congestion window cwnd being re-set to the congestion window "cwnd" plus a maximum segment size "MSS" (i.e., cwnd=cwnd+MSS) if "cwnd" is less than "ssthresh". To maintain a consistent data flow, data, e.g., the oldest data to be partially acknowledged is then re-transmitted 625 from sending host 115, assuming that the pipe value is less than the congestion window (i.e., pipe<cwnd).

A negative determination 610 of a partial ACK implies that ACK is a duplicate ACK. Accordingly, the pipe value is set 635 to be the pipe value less MSS (i.e., pipe=pipe−MSS). If the duplicate ACK is received before a first partial ACK and the ACK includes a SACK block that selectively acknowledges data under SRP and the congestion window is less than the slow-start threshold, (i.e., cwnd<ssthresh), the congestion window is increased by the maximums segment size "MSS" (i.e., cwnd=cwnd+MSS). To maintain a consistent data flow, lost data or new data are (re-)transmitted 625 from sending host 115, assuming that the pipe value is less than the congestion window.

It is noted that, in the event of a second retransmission timeout, the response processing described above is terminated and known slow-start processing commences.

Figure 7:
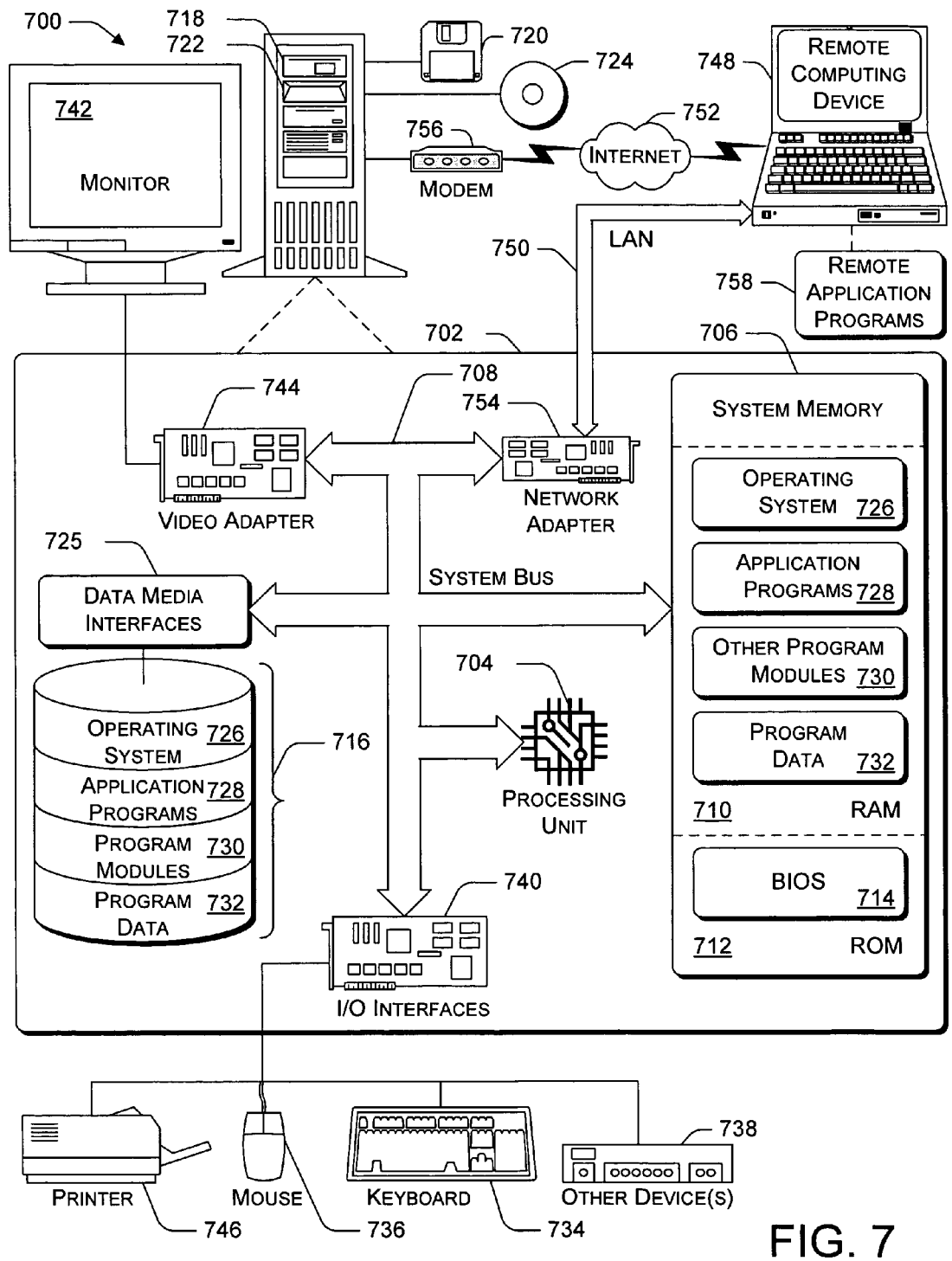
FIG. 7 illustrates a general computer network environment which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing device in the form of a computer 702. The components of computer 702 can include, but are not limited to, one or more processors or processing units 704, system memory 706, and system bus 708 that couples various system components including processor 704 to system memory 706.

System bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 702 may include a variety of computer readable media. Such media can be any available media that is accessible by computer 702 and includes both volatile and non-volatile media, removable and non-removable media.

System memory 706 includes computer readable media in the form of volatile memory, such as random access memory (RAM) 710; and/or non-volatile memory, such as read only memory (ROM) 712 or flash RAM. Basic input/output system (BIOS) 714, containing the basic routines that help to transfer information between elements within computer 702, such as during start-up, is stored in ROM 712 or flash RAM. RAM 710 typically contains data and/or program modules that are immediately accessible to and/or presently operated on by processing unit 704.

Computer 702 may also include other removable/non-removable, volatile/non-volatile computer storage media. By way of example, FIG. 7 illustrates hard disk drive 716 for reading from and writing to a non-removable, non-volatile magnetic media (not shown), magnetic disk drive 718 for reading from and writing to removable, non-volatile magnetic disk 720 (e.g., a "floppy disk"), and optical disk drive 722 for reading from and/or writing to a removable, non-volatile optical disk 724 such as a CD-ROM, DVD-ROM, or other optical media. Hard disk drive 716, magnetic disk drive 718, and optical disk drive 722 are each connected to system bus 708 by one or more data media interfaces 725. Alternatively, hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, removable magnetic disk 720, and removable optical disk 724, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 716, magnetic disk 720, optical disk 724, ROM 712, and/or RAM 710, including by way of example, operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as keyboard 734 and a pointing device 736 (e.g., a "mouse"). Other input devices 738 (not shown specifically) may include a microphone, joystick, game pad, satellite dish, serial port, scanner, and/or the like. These and other input devices are connected to processing unit 704 via input/output interfaces 740 that are coupled to system bus 708, but may be connected by other interface and bus structures, such as a parallel port, game port, or a universal serial bus (USB).

Monitor 742 or other type of display device can also be connected to the system bus 708 via an interface, such as video adapter 744. In addition to monitor 742, other output peripheral devices can include components such as speakers (not shown) and printer 746 which can be connected to computer 702 via I/O interfaces 740.

Computer 702 can operate in a networked environment using logical connections to one or more remote computers, such as remote computing device 748. As an example, remote computing device 748 can be a PC, portable computer, a server, a router, a network computer, a peer device or other common network node, and the like. Remote computing device 748 is illustrated as a portable computer that can include many or all of the elements and features described herein relative to computer 702. Alternatively, computer 702 can operate in a non-networked environment as well.

Logical connections between computer 702 and remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, computer 702 is connected to local network 750 via network interface or adapter 754. When implemented in a WAN networking environment, computer 702 typically includes modem 756 or other means for establishing communications over wide network 752. Modem 756, which can be internal or external to computer 702, can be connected to system bus 708 via I/O interfaces 740 or other appropriate mechanisms. The illustrated network connections are examples only and that other means of establishing at least one communication link between computers 702 and 748 can be employed.

In a networked environment, such as that illustrated with computing environment 700, program modules depicted relative to computer 702, or portions thereof, may be stored in a remote memory storage device. By way of example, remote application programs 758 reside on a memory device of remote computer 748. For purposes of illustration, applications or programs and other executable program components such as the operating system are illustrated herein as discrete blocks, although it is recognized that such programs and components reside at various times in different storage components of computing device 702, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. As an example and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method for responding to a spurious timeout, comprising:
    adjusting congestion state values by restoring a slow-start threshold value,
    setting a pipe value based on adding a maximum segment size capable of being sent by a sending host to a difference between a maximum sequence number sent so far and a lowest sequence number that is not yet acknowledged, and re-setting an initial value of a congestion window;
    maintaining a data flow on a network in accordance with the adjusted congestion state values, wherein data is transmitted if the pipe value is less than a congestion state window; and
    re-transmitting previously transmitted data when the previously transmitted data has been deemed to be lost on the network.

2. A method according to claim 1, wherein the slow-start threshold is a value of usable bandwidth detected prior to the timeout.

3. A method according to claim 1, wherein the re-setting the initial value of the congestion window includes setting the congestion window to be double that of a maximum data segment size.

4. A method according to claim 1, wherein maintaining a data flow in accordance with the adjusted congestion state values includes:
    transmitting a data packet;
    receiving an acknowledgement; and
    re-setting the congestion window by adding the maximum data segment size capable of being sent by the sending host.

5. A method according to claim 1, wherein re-transmitting previously transmitted data when the previously transmitted data has been deemed to be lost on the network includes re-transmitting previously transmitted data when three duplicate acknowledgements are received by a sending host.

6. A method according to claim 5, further comprising implementing a slow-start recovery process.

7. A method according to claim 5, further comprising implementing a slow-start recovery process, which includes:
    readjusting the pipe value; and
    re-setting the size of the congestion window in accordance with a pattern of received acknowledgements.

8. A method according to claim 7, further comprising maintaining a data flow according to a slow-start recovery process.

9. A method for responding to a spurious timeout on a network, comprising:
    restoring congestion state values, including setting a limit of data that a sending host can send over the network before receiving an acknowledgement;
    restoring a threshold value of available bandwidth prior to the spurious timeout;
    adjusting a pipe value, wherein the pipe value is based on an estimate of data outstanding on the network prior to the spurious timeout and is based on adding a maximum segment size capable of being sent by a sending host to a difference between a maximum sequence number sent and a lowest sequence number that is not yet acknowledged;

maintaining a data flow from the sending host, wherein data is transmitted if the pipe value is less than a congestion state window; and resetting, upon receiving an acknowledgement, the limit of data that the sending host can send over the network before receiving an acknowledgement.

10. A method according to claim 9, wherein the limit of data that the sending host can send over the network in before receiving an acknowledgement is set to twice the maximum data segment size that the sending host can send.

11. A method according to claim 9, wherein the limit of data that the sending host can send over the network before receiving an acknowledgement is re-set, upon receiving an acknowledgement, by adding the maximum data segment size that the sending host can send.

12. A method according to claim 9, further comprising re-transmitting data when data previously transmitted over the network is confirmed to be lost on the network.

13. A method according to claim 12, wherein data previously transmitted over the network is confirmed to be lost on the network upon receiving three duplicate acknowledgements.

14. A computer-readable storage medium embedded with a computer executable program having at least one instruction that, upon detecting a timeout on a network, causes at least one processor to:

adjust congestion state values including adjusting a pipe value, wherein the pipe value is based on an estimate of an amount of data outstanding in the network to a maximum segment size sent by a sending host plus a difference between a maximum sequence number sent and a lowest sequence number that is not yet acknowledged;

maintain a data flow on the network, wherein data is transmitted if the pipe value is less than a congestion state window; and re-transmit previously transmitted data when the previously transmitted data is determined to be lost on the network.

15. A computer-readable storage medium embedded with a computer executable program according to claim 14, wherein the at least one instruction to adjust congestion state values includes at least one instruction to:

limit an amount of data that a sending host can send before receiving an acknowledgement to be twice a maximum data segment size capable of being sent by the sending host.

16. A computer-readable storage medium embedded with a computer executable program according to claim 15, wherein the at least one instruction to maintain a data flow on the network includes at least one instruction to:

increase the amount of data that the sending host can send before receiving an acknowledgement by the maximum data segment size capable of being sent by the sending host.

17. A computer-readable storage medium embedded with a computer executable program according to claim 14, wherein the at least one instruction to re-transmit previously transmitted data when the previously transmitted data is determined to be lost on the network includes at least one instruction that causes at least one processor to:

initiate slow-start processing.

18. An apparatus for spurious timeout recovery, comprising:

a transmitter to transmit data packets;
a transmission timer to detect a spurious timeout; and
a response processor
to adjust congestion state values by setting a limit for an amount of data that a sending host sends before receiving an acknowledgement to be twice a size of a data segment that the sending host can send,
to maintain a data flow on a network with the adjusted congestion state values, wherein data is transmitted if a pipe value is less than a congestion state window, wherein the pipe value is based on adding a maximum segment size capable of being sent by the sending host to a difference between a maximum sequence number sent and a lowest sequence number that is not yet acknowledged, and
to re-transmit previously transmitted data when the previously transmitted data has been deemed to be lost on the network, wherein the data flow is maintained until data is confirmed to be lost on the network.

19. An apparatus according to claim 18, wherein to maintain a data flow on the network in accordance with the adjusted congestion state values is to:

reset, upon receiving an acknowledgement, a limit to the amount of data that a sending host can send before receiving an acknowledgement by adding the size of a data segment that the sending host can send; and transmitting data on the network.

20. An apparatus according to claim 18, wherein to re-transmit previously transmitted data when the previously transmitted data has been deemed to be lost on the network is to re-transmit the previously transmitted data upon receiving three duplicate acknowledgements.

21. An apparatus according to claim 18, wherein the apparatus is to further process a slow-start recovery.

22. A processor, comprising:

means for adjusting congestion state values, said means for adjusting congestion state values including a means for adjusting a pipe value, wherein the pipe value is based on an estimate of an amount of data outstanding in a network to a maximum segment size capable of being sent by a sending host plus a difference between a maximum sequence number sent and a lowest sequence number that is not yet acknowledged;

means for maintaining a data flow on a network in accordance with the adjusted congestion state values, wherein data is transmitted if the pipe value is less than a congestion state window; and means for re-transmitting previously transmitted data when the previously transmitted data has been deemed to be lost on the network.

23. A processor according to claim 22, wherein the means for maintaining the data flow on the network in accordance with the adjusted congestion state values re-sets, upon receiving an acknowledgement, a limit to the amount of data that a sending host can send before receiving an acknowledgement by adding the size of a data segment that the sending host can send and continues to transmit data on the network.

24. A processor according to claim 22, wherein the means for re-transmitting previously transmitted data re-transmits the previously transmitted data upon receiving three duplicate acknowledgements.

* * * * *